G. N. STEARNS.
Vises.
No. 5,574. Reissued September 16, 1873.
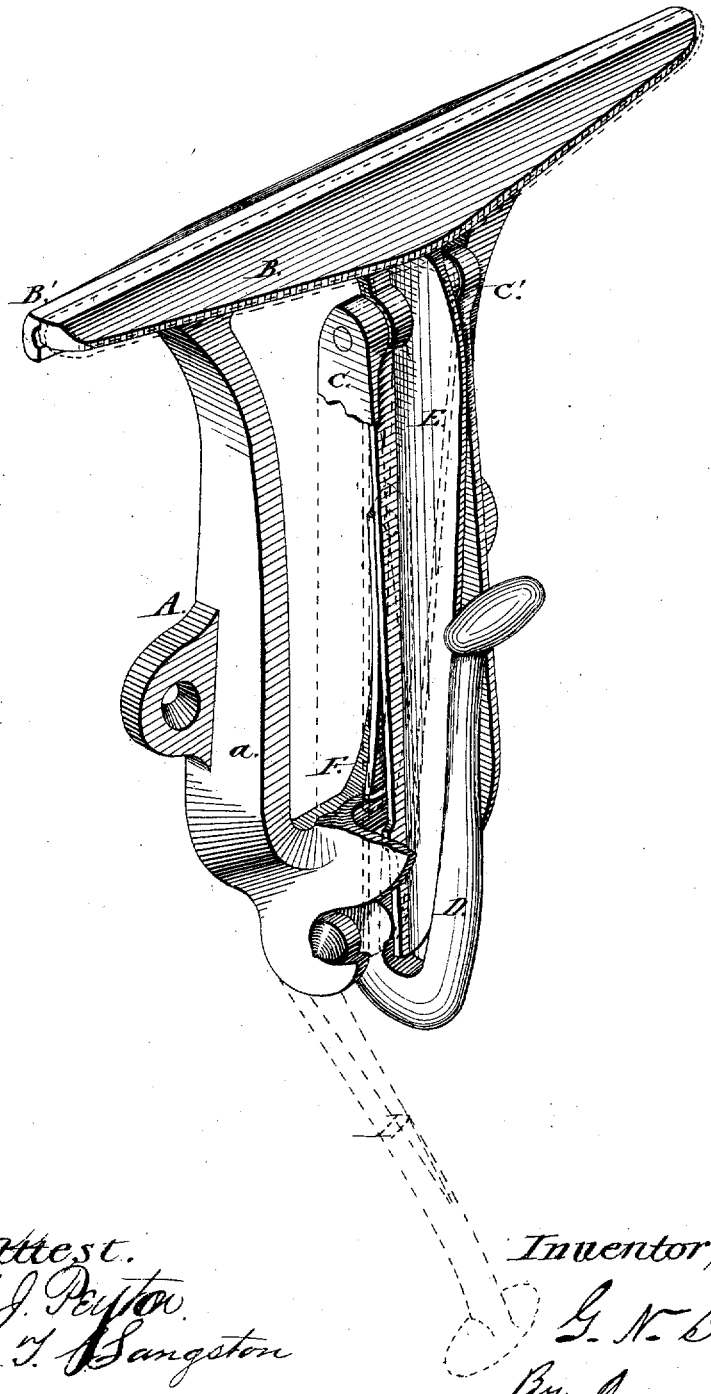
Attest.
W. J. Peyton.
A. T. Sangston
Inventor;
G. N. Stearns.
By James L. Norris.
Atty.
AM. PHOTO-LITHOGRAPHIC Co. N.Y. (OSBORNE'S PROCESS)

UNITED STATES PATENT OFFICE.

GEORGE N. STEARNS, OF SYRACUSE, NEW YORK.

IMPROVEMENT IN VISES.

Specification forming part of Letters Patent No. 58,692, dated October 9, 1866; reissue No. 5,574, dated September 16, 1873; application filed August 19, 1872.

*To all whom it may concern:*

Be it known that I, GEORGE N. STEARNS, of Syracuse, New York, have invented certain Improvements in Vises for Holding Saws, of which the following is a specification:

My invention consists of a frame or base, from the lower portion of which rises vertical supports or arms, which form the fulcrum for the extended portion or lever of the movable jaw and for a cam-lever which acts directly upon said extended lever or jaw, the several parts being so constructed and arranged that the same will be combined in a firm and compact body, and thus form a substantial device for the purpose of holding saws while being sharpened, and, further, from the construction of the frame, be capable of being fastened upon a work-bench or other suitable base, so as to be in a convenient position for the operator. The invention also consists in forming one of the jaws with a concave projection extending below the other jaw, and beyond the line of intersection of the jaws when closed, in such a manner that a saw-blade can be interposed and clamped in position between the jaws, and the usual vibration of the blade during the sharpening operation be greatly lessened, if not wholly avoided.

In the drawings, the figure represents a perspective view of the improved device for holding saws while being sharpened.

The letter A designates the frame of the vise, possessing the arms *a a*, having, at its upper end, the stationary jaw B′, while from or near its lower end rise vertical arms or supports C C′, the same being a continuation of the arms *a a* of the frame, and serving as the fulcrum or pivot support for both the movable jaw B and the cam or eccentric lever D. The movable jaw is formed with an extension or lever, E, so that the same thus produced will be of a T shape. This extension or lever E of the movable jaw is pivoted or journaled upon and between the vertical arms C C′ of the frame, so as to cause the faces of the jaws B B′ to approach each other when power is applied upon the cam-lever D, which bears directly upon the extension or lever E of the jaw B, the said cam-lever being interposed between the arms and in line with the extension or lever E.

By means of the vertical arms C C′ rising from the lower portion of the frame A, having the jaw B′, I am enabled to bring the fulcrum of the lever-arm of the movable jaw in proximity to the point where the movable jaw presses upon the saw, and thus gain a sufficient length of lever for the cam C to effectually perform its important office.

The device may be used with or without a reaching-spring, F, upon the lever-arm E for operating the movable jaw; but I prefer to use the said spring, which is attached at one end to the lever E and the other end made to bear on the frame-work, which has the effect of forcing the jaw B from the jaw B′ when pressure on the former is removed.

In order to retain the saw in a true and firm position, and overcome vibration of the same, I provide the face of the jaw B′ with a concave projection extending below the jaw and beyond the line of intersection of the jaws when closed, and also form the jaw B with an offset at its lower edge to extend slightly into the concavity of the jaw B, thus producing this desired result.

I claim as my invention—

1. The movable jaw B, having extension or lever E journaled upon and between the vertical arms C C′ rising from the lower portion of the frame A, having jaw B′, in combination with each other and with a cam-lever, D, journaled between the upright arms C C′, substantially as herein shown and described, for the purpose specified.

2. The jaw B′, having concave projection extending below the jaw B, and beyond the line of intersection of the jaws when closed, substantially as and for the purpose specified.

G. N. STEARNS.

Witnesses:
N. B. SMITH,
C. W. SMITH.